US011916312B2

(12) United States Patent
Arai

(10) Patent No.: US 11,916,312 B2
(45) Date of Patent: Feb. 27, 2024

(54) ANTENNA MODULE, COMMUNICATION DEVICE MOUNTING THE SAME, AND CIRCUIT BOARD

(71) Applicant: Murata Manufacturing Co., Ltd., Nagaokakyo (JP)

(72) Inventor: Kota Arai, Nagaokakyo (JP)

(73) Assignee: MURATA MANUFACTURING CO., LTD., Nagaokakyo (JP)

( * ) Notice: Subject to any disclaimer, the term of this patent is extended or adjusted under 35 U.S.C. 154(b) by 233 days.

(21) Appl. No.: 17/679,102

(22) Filed: Feb. 24, 2022

(65) Prior Publication Data

US 2022/0181781 A1 Jun. 9, 2022

Related U.S. Application Data

(63) Continuation of application No. PCT/JP2020/024808, filed on Jun. 24, 2020.

(30) Foreign Application Priority Data

Aug. 27, 2019 (JP) ................................ 2019-154880

(51) Int. Cl.
*H01Q 1/22* (2006.01)
*H01Q 9/04* (2006.01)
*H01Q 13/08* (2006.01)

(52) U.S. Cl.
CPC ........... *H01Q 9/0407* (2013.01); *H01Q 13/08* (2013.01)

(58) Field of Classification Search
CPC ...... H01Q 9/0407; H01Q 13/00; H01Q 21/06; H01Q 9/0414; H01Q 1/2283
See application file for complete search history.

(56) References Cited

U.S. PATENT DOCUMENTS

2019/0221937 A1* 7/2019 Onaka .................... H01Q 5/385
2020/0411950 A1* 12/2020 Kuroda ................ H01Q 1/2283

FOREIGN PATENT DOCUMENTS

CN 104662737 A 5/2015
CN 109845034 A 6/2019
(Continued)

OTHER PUBLICATIONS

English translation of the Written Opinion dated Sep. 24, 2020, received for PCT Application PCT/JP2020/024808.
(Continued)

*Primary Examiner* — David E Lotter
(74) *Attorney, Agent, or Firm* — XSENSUS LLP

(57) ABSTRACT

An antenna module includes a dielectric substrate having a multilayer structure, a radiating element, a feed wiring, a filter device, and a ground electrode. The dielectric substrate has a first main surface and a second main surface. The radiating element is formed on the first main surface of the dielectric substrate or in an inner layer than the first main surface. The feed wiring transmits a radio frequency signal to the radiating element. The filter device is arranged on the feed wiring. The ground electrode faces the radiating element and is arranged in a layer between the radiating element and the filter device. A recess is formed in the second main surface of the dielectric substrate. The filter device is arranged at a position that does not overlap with the recess when viewed in a plan view from a normal direction of the dielectric substrate.

20 Claims, 12 Drawing Sheets

(56) References Cited

FOREIGN PATENT DOCUMENTS

| | | | |
|---|---|---|---|
| JP | 2001-94336 | A | 4/2001 |
| JP | 2004-274259 | A | 9/2004 |
| JP | 2005-19649 | A | 1/2005 |
| WO | 2014/045966 | A1 | 3/2014 |
| WO | 2018/074377 | A1 | 4/2018 |

OTHER PUBLICATIONS

International Search Report and Written Opinion dated Sep. 24, 2020, received for PCT Application PCT/JP2020/024808, Filed on Jun. 24, 2020, 9 pages including English Translation.

Office Action dated Aug. 28, 2023 in Chinese Patent Application No. 202080060294.0, 21 pages.

* cited by examiner

ANTENNA MODULE, COMMUNICATION DEVICE MOUNTING THE SAME, AND CIRCUIT BOARD

CROSS-REFERENCE TO RELATED APPLICATIONS

The present application is a continuation application of International Patent Application No. PCT/JP2020/024808, filed Jun. 24, 2020, which claims priority to Japanese patent application JP 2019-154880, filed Aug. 27, 2019, the entire contents of each of which being incorporated herein by reference.

TECHNICAL FIELD

The present disclosure relates to an antenna module and a communication device having the antenna module mounted thereon, and more particularly, to a structure of an antenna module in which a filter is incorporated in a substrate on which an antenna element is formed.

BACKGROUND ART

Japanese Unexamined Patent Application Publication No. 2001-094336 (Patent Document 1) discloses a patch antenna with a built-in filter in which a radiation conductor (antenna element) and a filter are provided in a same base body made of a dielectric material.

CITATION LIST

Patent Document

Patent Document 1: Japanese Unexamined Patent Application Publication No. 2001-094336

SUMMARY

Technical Problems

Such an antenna may be applied to, for example, a communication terminal such as a mobile phone or a smartphone. In such a communication terminal, it is desired to reduce the size and thickness of the device.

As in Japanese Unexamined Patent Application Publication No. 2001-094336 (Patent Document 1), by disposing a filter in the same substrate as an antenna element (radiating element), it is possible to reduce the size of the entire antenna module. In such a configuration, it is necessary to ensure both antenna characteristics and filter characteristics. It is known that a frequency band width of radio waves transmitted and received among antenna characteristics increases as a distance between a radiating element and a ground electrode increases. Further, in a filter formed as a strip line or a microstrip line in a dielectric substrate, it is known that a Q value is improved by increasing the thickness of the filter (i. e., the thickness of the dielectric).

Here, an electronic component such as an RFIC serving as a feed circuit may be mounted or a terminal (connector) or the like for connecting to a mounting substrate may be arranged on a surface of the substrate on which the antenna module is formed, the surface being opposite to a radio wave radiation direction. In such a case, as recognized by the present inventor, when the thickness of the dielectric substrate is ensured in order to realize desired antenna characteristics and filter characteristics, the size of the entire antenna module increases, and there is a possibility that a state in which the reduction in height and thickness is inhibited is brought about.

The present disclosure has been made to solve the above-described, and other, problems, and thus an aspect of the present disclosure is to realize the reduction in height of an antenna module with a built-in filter while maintaining antenna characteristics and filter characteristics.

Solution to Problem

An antenna module according to an aspect of the present disclosure includes a dielectric substrate having a multilayer structure, a radiating element, a first feed wiring, a first filter, and a first ground electrode. The dielectric substrate has a first main surface and a second main surface. The radiating element is formed on the first main surface or in an inner layer of the dielectric substrate. The first feed wiring conveys a radio frequency signal to the radiating element. The first filter is arranged on a signal path of the first feed wiring. The first ground electrode faces the radiating element and is arranged in a layer between the radiating element and the first filter. The second main surface of the dielectric substrate includes a substrate. As viewed in a plan view from the normal direction of the dielectric substrate, the first filter is arranged at a position that does not overlap with the recess.

A circuit board according to another aspect of the present disclosure is a device for supplying a radio frequency signal to a radiating element, and includes a dielectric substrate having a multilayer structure, a feed wiring, a filter, and a ground electrode. The feed wiring conveys a radio frequency signal to the radiating element. The filter is arranged on a signal path of the feed wiring. The ground electrode is arranged in a layer between a first main surface of the dielectric substrate and the filter. The second main surface of the dielectric substrate includes recess. As viewed in a plan view from a normal direction of the dielectric substrate, the filter is arranged at a position that does not overlap with the recess.

Advantageous Effects of Invention

In an antenna module and a circuit board according to the present disclosure, a recess is formed in a second main surface (rear surface) of a dielectric substrate on which a filter is formed, and the filter is arranged at a position that does not overlap with the recess when the dielectric substrate is viewed in a plan view. With such a configuration, it is possible to accommodate other components such as an RFIC or the like in the recess while ensuring the thickness of the dielectric necessary for realizing the antenna characteristics and the filter characteristics. Therefore, it is possible to reduce the height of the entire antenna module while maintaining the antenna characteristics and the filter characteristics.

DESCRIPTION OF EMBODIMENTS

Figure 1:
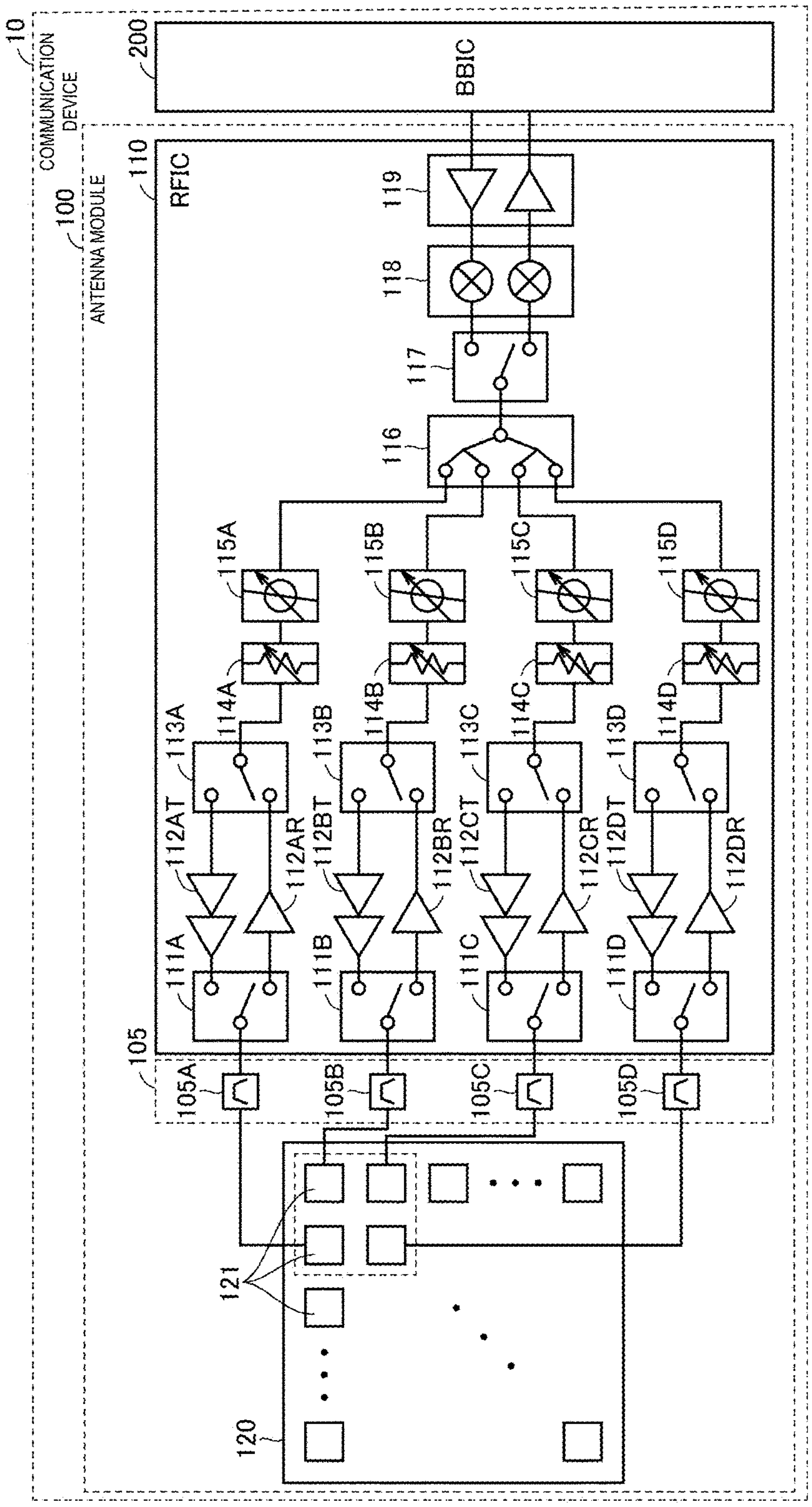
FIG. 1 is a block diagram of a communication device to which an antenna module according to Embodiment 1 is applied.

Hereinafter, embodiments of the present disclosure will be described in detail with reference to the drawings. Note that in the drawings, the same or corresponding portions are denoted by the same reference numerals, and description thereof will not be repeated.

Embodiment 1

(Configuration of Communication Device)

FIG. 1 is an example of a block diagram of a communication device 10 to which an antenna module 100 according to Embodiment 1 is applied. The communication device 10 is, for example, a mobile terminal such as a mobile phone, a smartphone, or a tablet, or a personal computer having a communication function. An example of the frequency band of radio waves used in the antenna module 100 according to the present embodiment is for radio waves in a millimeter wave band (e.g., one or more sub-bands within a frequency range that spans 27 GHz through 300 GHz) having center frequencies of 28 GHz, 39 GHz, 60 GHz, and the like, for example, but can be applied to radio waves in frequency bands other than the above.

Referring to FIG. 1, the communication device 10 includes circuitry such as the antenna module 100 and a baseband integrated circuit (BBIC) 200 that may be implemented as, or part of, a baseband signal processing circuit. The antenna module 100 includes an RFIC 110 that is an example of a feed circuit, an antenna device 120, and a filter device 105. The communication device 10 up-converts signals transmitted from the BBIC 200 to the antenna module 100 into radio frequency (RF) signals in the radio frequency integrated circuit (RFIC) 110, and radiates the RF signals from the antenna device 120 after passing through the filter device 105. While the term "device" is used in this case to describe the bank of filter circuits in the filter device 105, it should be recognized that the filter device 105 may also be described as filter circuitry. In addition, the communication device 10 transmits radio frequency signals received by the antenna device 120 to the RFIC 110 via the filter device 105, down-converts the signals, and processes the signals in the BBIC 200.

In FIG. 1, for ease of description, among a plurality of feed elements (radiating elements) 121 configuring the antenna device 120, only configurations corresponding to four feed elements 121 are illustrated, and configurations corresponding to other feed elements 121 having similar configurations are omitted. Note that although FIG. 1 illustrates an example in which the antenna device 120 is formed of the plurality of feed elements 121 arranged in a two-dimensional array, the antenna device 120 may be a one-dimensional array in which the plurality of feed elements 121 is arranged in a line (e.g., linear array) or may have one feed element. In the present embodiment, each feed element 121 is a patch antenna having a substantially square flat plate shape.

The RFIC 110 includes switches 111A to 111D, 113A to 113D, and 117, power amplifiers 112AT to 112DT, low-noise amplifiers 112AR to 112DR, attenuators 114A to 114D, phase shifters 115A to 115D, a signal multiplexer/demultiplexer 116, a mixer 118, and an amplifier circuit 119.

The communication device 10 is a transceiver, and so when radio frequency signals are transmitted, the switches 111A to 111D and 113A to 113D are switched to the power amplifiers 112AT to 112DT side, and the switch 117 is connected to a transmission-side amplifier of the amplifier circuit 119. When radio frequency signals are received, the switches 111A to 111D and 113A to 113D are switched to the low-noise amplifiers 112AR to 112DR side, and the switch 117 is connected to a reception-side amplifier of the amplifier circuit 119.

Signals transmitted from the BBIC 200 are amplified by the amplifier circuit 119 and up-converted by the mixer 118. Transmission signals, which are up-converted radio frequency signals, are divided into four signals by the signal multiplexer/demultiplexer 116, pass through four signal paths, and are respectively fed to the different feed elements 121. At this time, the directivity of the antenna device 120 can be adjusted by individually adjusting signal phase (i.e., respective phase for each signal is rotated by a predetermined degree, phase shift degree) of the phase shifters 115A to 115D arranged in the respective signal paths.

Reception signals, which are radio frequency signals received by the feed elements 121, pass through four different signal paths, and are multiplexed by the signal multiplexer/demultiplexer 116. The multiplexed reception signals are down-converted by the mixer 118, amplified by the amplifier circuit 119, and transmitted to the BBIC 200.

The filter device 105 includes filters 105A to 105D. The filters 105A to 105D are connected to the switches 111A to 111D in the RFIC 110, respectively. The filters 105A to 105D have a function of attenuating signals in a specific frequency band. The filters 105A to 105D may be a band pass filter, a high pass filter, a low pass filter, or a combination thereof. Radio frequency signals from the RFIC 110 pass through the filters 105A to 105D and are supplied to the corresponding feed elements 121.

In the case of radio frequency signals in the millimeter wave band, there is a tendency that a signal due to a transmission path is greatly attenuated as a transmission line becomes longer. Therefore, it is preferable to make a distance between the filter device 105 and the feed element 121 as short as possible. That is, by causing the radio frequency signal to pass through the filter device 105 immediately before being emitted from the feed element 121, it is possible to suppress unnecessary waves from being radiated from the feed element. Also, by causing the reception signal to pass through the filter device 105 immediately after reception at the feed element 121, it is possible to remove unnecessary waves included in the reception signal.

Note that although the filter device 105 and the antenna device 120 are separately illustrated in FIG. 1, in the present disclosure, as described later, the filter device 105 is formed inside the antenna device 120.

The RFIC 110 is formed as, for example, a one-chip integrated-circuit component including the above-described circuit configuration. Alternatively, devices (switches, power amplifiers, low-noise amplifiers, attenuators, and phase shifters) corresponding to the feed elements 121 in the RFIC 110 may be formed as one-chip integrated-circuit component for each corresponding feed element 121.

(Configuration of Antenna Module)

Figure 2:
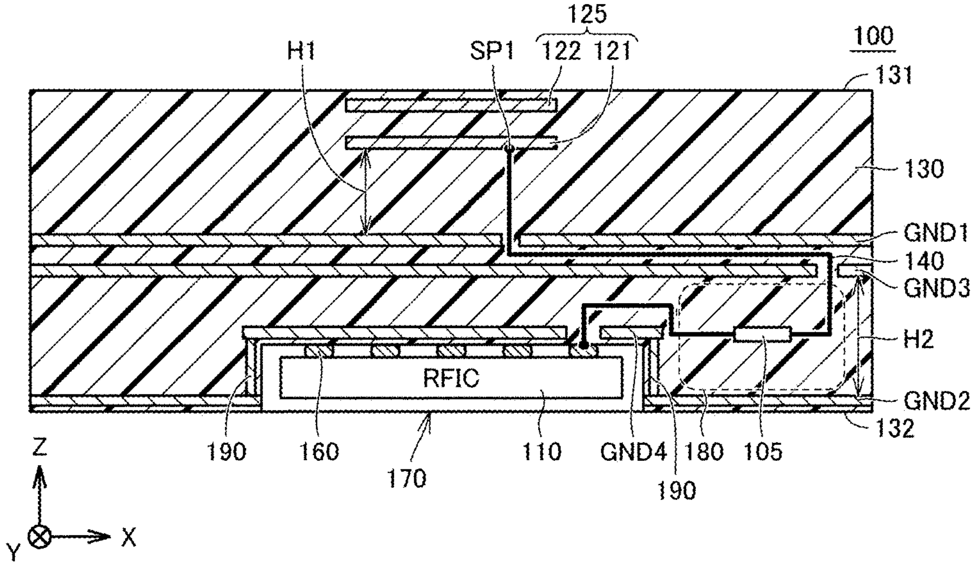
FIG. 2 is a side perspective view of the antenna module of FIG. 1.
Figure 3:
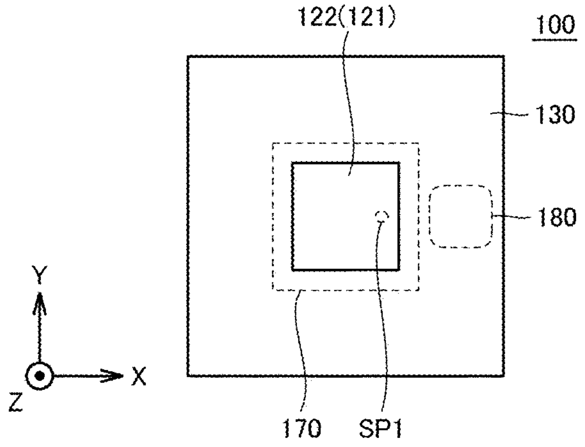
FIG. 3 is a plan view of the antenna module of FIG. 1.

Next, the configuration of the antenna module 100 according to Embodiment 1 will be described in detail with reference to FIG. 2 and FIG. 3. In FIG. 2 and FIG. 3, for ease of description, a case where there is one feed element 121 will be described. FIG. 2 illustrates a side perspective view of the antenna module 100, and FIG. 3 illustrates a plan view of the antenna module 100.

Referring to FIG. 2 and FIG. 3, the antenna module 100 includes, in addition to the feed element 121, the filter device 105, and the RFIC 110, a parasitic element 122, a dielectric substrate 130, a feed wiring 140, and ground electrodes GND1 to GND4. Note that in the following description, the feed element 121 and the parasitic element 122 are also collectively referred to as a "radiating element 125". Further, a normal direction of the dielectric substrate 130 (radiation direction of radio waves) is defined as a Z-axis direction, and a plane perpendicular to the Z-axis direction is defined by an X-axis and a Y-axis. A positive direction and a negative direction of a Z-axis in each drawing may be referred to as an upper side and a lower side, respectively.

Dielectric substrate 130 is, for example, a low temperature co-fired ceramics (LTCC) multilayer substrate, a multilayer resin substrate formed by laminating a plurality of resin layers made of resin such as epoxy or polyimide, a multilayer resin substrate formed by laminating a plurality of resin layers made of liquid crystal polymer (LCP) having a lower dielectric constant, a multilayer resin substrate formed by laminating a plurality of resin layers made of fluorine-based resin, or a ceramic multilayer substrate other than LTCC. Note that the dielectric substrate 130 does not necessarily have a multilayer structure, and may be a single-layer substrate.

The dielectric substrate 130 has a substantially rectangular section, and the radiating element 125 is arranged in a layer close to a first main surface 131 (a surface in the positive direction of the Z-axis). More specifically, of the two sub-elements of the radiating element 125, the parasitic element 122 is arranged on the first main surface 131 of the dielectric substrate 130 or, as illustrated in FIG. 2, in an inner layer, where "inner" refers to within the dielectric substrate 130 with respect to the first main surface 131. The feed element 121 faces the parasitic element 122, and is arranged in a layer on the lower side than the parasitic element 122 so as to be separated therefrom.

The feed element 121 and the parasitic element 122 are a patch antenna having a substantially square planar shape. The feed element 121 and the parasitic element 122 have substantially the same size, and have the same or close resonant frequencies. When a radio wave is emitted from the feed element 121, the parasitic element 122 resonates (electrically) accordingly. As a result, the band width of the emitted radio wave can be expanded.

In the dielectric substrate 130, the ground electrode GND1 having a flat plate shape is arranged on the further lower side than the feed element 121. In other words, the feed element 121 is formed in a layer between the parasitic element 122 and the ground electrode GND1. Radio frequency signals are supplied to the feed element 121, and the feed element 121 and the ground electrode GND1 are electromagnetically coupled to each other, as a result, radio waves are emitted from the feed element 121 that function as an antenna.

A recess 170 is formed in a part of a second main surface 132 (back surface) of the dielectric substrate 130. The RFIC 110 is mounted in the recess 170 via a solder bump 160. Note that the RFIC 110 may be connected to the dielectric substrate 130 using a multi-pole connector instead of the solder connection.

In the dielectric substrate 130, the ground electrode GND2 is formed on the second main surface 132 other than the recess 170 or in an inner layer than the second main surface 132 (i. e., between the second main surface 132 and the ground electrode GND1). Further, the ground electrode GND4 is arranged in the inner layer of the dielectric substrate 130 in the recess 170 (that is, between the recess 170 and the ground electrode GND1). The ground electrode GND4 is formed so as to close a cavity of the ground electrode GND1 formed in a portion of the recess 170. The ground electrode GND2 and the ground electrode GND4 are electrically connected by a plurality of vias 190. The ground electrode GND2 and the ground electrode GND4 prevent an electromagnetic field generated in the dielectric substrate 130 from leaking to the lower side of the dielectric substrate 130.

In addition, the ground electrode GND3 is further arranged between the ground electrode GND1 and the ground electrodes GND2 and GND4. A layer between the ground electrode GND1 and the ground electrode GND3 functions as a wiring layer for arranging wiring for connecting elements in the dielectric substrate 130.

The filter device 105 is arranged in a layer between the ground electrode GND2 and the ground electrode GND3. The filter device 105 is formed of, for example, a resonant line-type filter having a configuration in which a plurality of lines each having a length of λ/4 or λ/2 is adjacent to each other in a non-connected state, where λ is a wave length of a radio wave to be emitted. In the present disclosure, a region substantially functioning as a filter formed by the filter device 105 and the dielectric between the ground electrode GND2 and the ground electrode GND3 is referred to as a filter region 180. As illustrated in FIG. 3, in the antenna module 100, the filter device 105 is arranged such that the filter region 180 does not overlap with the recess 170 when the dielectric substrate 130 is viewed in a plan view from the normal direction.

The feed wiring 140 transmits radio frequency signals from the RFIC 110 to the feed element 121 via the filter device 105. The feed wiring 140 penetrates the ground electrode GND3 after passing through the filter device 105, extends through the wiring layer, and reaches the feed element 121 from directly below the feed element 121.

In the examples of FIG. 2 and FIG. 3, a feed point SP1 of the feed element 121 is arranged at a position offset from the center of the feed element 121 in the positive direction of the X-axis. As a result, a radio wave having a polarization direction corresponding to the X-axis direction is emitted from the feed element 121. In addition, the radiating element, the ground electrode, and the wiring pattern and the via forming the feed wiring are formed of a metal containing aluminum (Al), copper (Cu), gold (Au), silver (Ag), or an alloy thereof as a main component.

Figure 4:
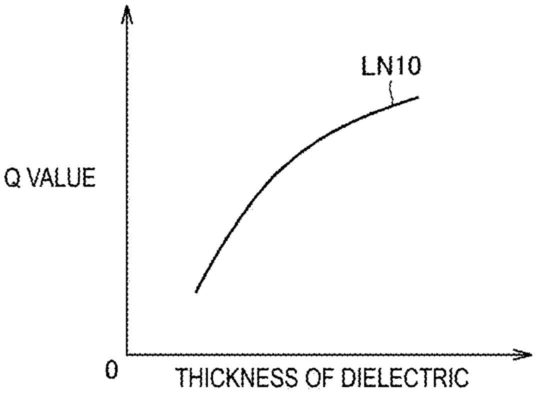
FIG. 4 is a diagram for explaining a relationship between a thickness of a dielectric and a Q value.

In the antenna module having the above-described configuration, a distance H1 between the feed element 121 and the ground electrode GND1 determines the frequency band width of radio waves to be emitted. To be more specific, as the distance H1 increases, the frequency band width increases. On the other hand, the Q value is affected by the thickness of the dielectric in the filter region 180 (i. e., a distance H2 between the ground electrode GND2 and the ground electrode GND3). To be more specific, as indicated by a line LN10 in FIG. 4, the Q value of the filter increases as the dielectric becomes thicker. That is, in the case where the filter is formed as a strip line as illustrated in FIG. 2, in order to secure a high Q value, it is desirable to make the dielectric between the ground electrodes in the filter region 180 (H2 in FIG. 2) as thick as possible.

As described above, from the viewpoint of antenna characteristics and filter characteristics, it may be required to increase the thickness of the dielectric substrate as much as possible in order to realize desired specifications. On the other hand, there is still a high demand for reduction in size and/or thickness of the communication device, and thus further reduction in height of the antenna module may be necessary.

In some cases, an RFIC or another electronic component is mounted on the antenna module, or a terminal (connector) for connecting to an external substrate is arranged on the antenna module, however, when such an external device is simply attached to the antenna module, the thickness (height) of the entire antenna module increases, which may hinder the reduction in height.

As described with reference to FIG. 2, the antenna module 100 according to Embodiment 1 has a configuration in which the recess 170 is formed on the second main surface 132 (rear surface) of the dielectric substrate 130 and the RFIC 110 is arranged inside the recess 170. The filter device 105 is arranged such that the filter region 180 does not overlap with the recess 170 when the antenna module 100 is viewed in a plan view from the normal direction of the dielectric substrate 130. With such a configuration, it is possible to suppress an increase in the overall thickness of the antenna module 100 including the RFIC 110 while maintaining the distance H1 and the distance H2 in FIG. 2, compared to a case where the recess 170 is not provided.

Note that in the above-described antenna module 100, the case where the RFIC 110 is arranged in the recess 170 has been described as an example, however, instead of and/or in addition to the RFIC 110, another electronic component may be arranged in the recess 170, or a terminal (a plate electrode, a connector, or the like) for connecting to an external substrate and an external device may be formed.

In addition, there may be a case where the electronic component and the terminal as described above are not formed, and a space is simply formed by a recess. For example, in a mounting substrate on which an antenna module is mounted, in a case where an electronic component is arranged on an opposing surface of the antenna module, by arranging the antenna module such that the electronic component is fit in a space formed by the recess, it is possible to reduce the size of the entire configuration including the mounting substrate and the antenna module.

Figure 5:
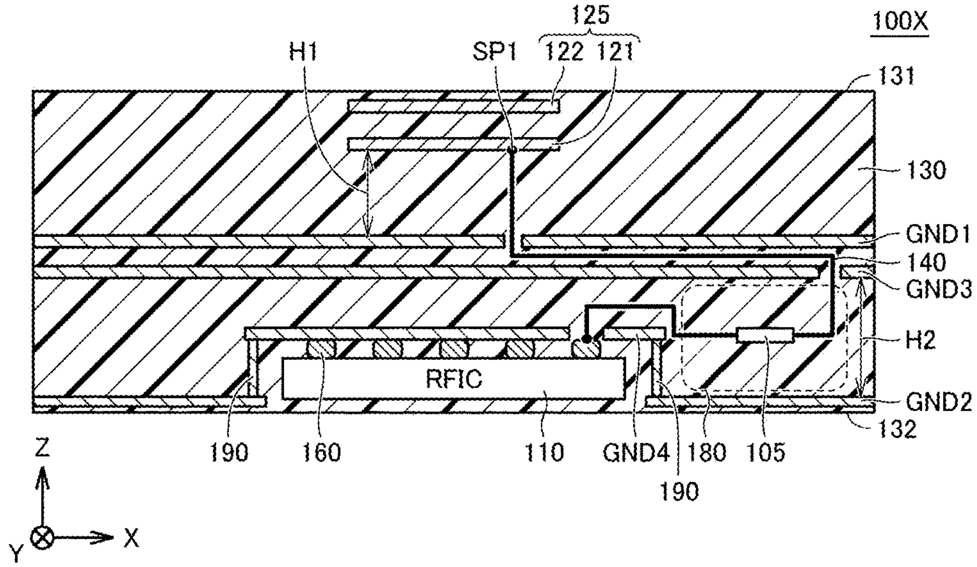
FIG. 5 is a side perspective view of another example of the antenna module according to Embodiment 1.

Further, in a case where the RFIC 110 or another electronic component is arranged in the recess 170, as illustrated in an antenna module 100X of FIG. 5, the inside of a portion corresponding to the recess 170 of FIG. 2 may be filled with a dielectric. In this case, the dielectric in the recess 170 may be a dielectric made of the same material as that of the dielectric substrate 130 or a dielectric made of a different material. In other words, the antenna module 100X has a configuration in which an electronic component such as the RFIC 110 is arranged in a recess formed by the ground electrodes GND2 and GND4 and the vias 190 in the dielectric substrate 130 and offset in a direction from the second main surface 132 toward the first main surface 131.

Note that the "feed wiring 140" of Embodiment 1 corresponds to a "first feed wiring" of the present disclosure. The "filter device 105" of Embodiment 1 corresponds to a "first filter" of the present disclosure. In addition, the "ground electrode GND1" and the "ground electrode GND2" of Embodiment 1 correspond to a "first ground electrode" and a "second ground electrode" of the present disclosure, respectively.

(Modification 1)

In the antenna module 100 of Embodiment 1, an example of the configuration in which the recess 170 is arranged directly below the radiating element 125 has been described. Since the filter region 180 is formed so as not to overlap the recess 170, the filter region 180 is formed at a position that does not overlap with the radiating element 125 when the antenna module 100 is viewed in a plan view.

On the other hand, when the area of the main surface of the dielectric substrate is limited, there may be a case where the arrangement of the recess and the filter region as illustrated in FIG. 2 and FIG. 3 cannot be realized. Therefore, in Modification 1, at least a part of the filter region overlaps with the radiating element when the antenna module is viewed in a plan view. As a result, the dielectric substrate can be reduced in size, and the insertion loss of the antenna module can be improved because the distance of the feed wiring from the filter to the feed element is shortened.

Figure 6:
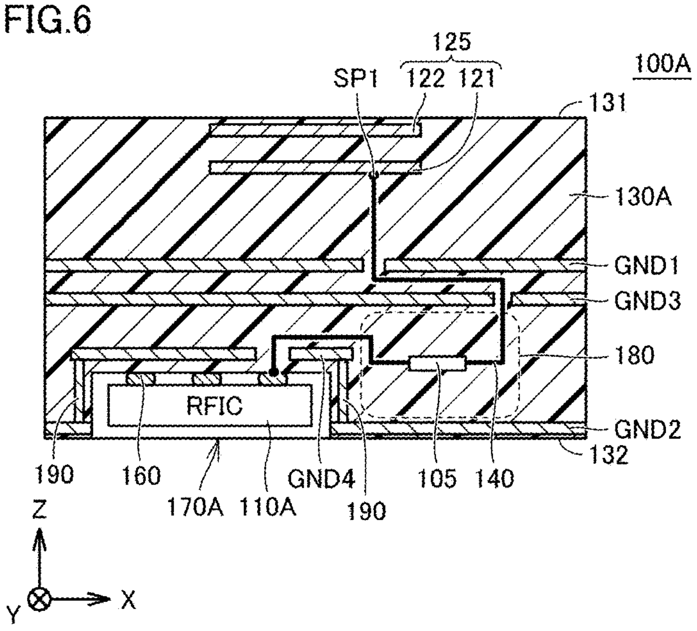
FIG. 6 is a side perspective view of an antenna module according to Modification 1.
Figure 7:
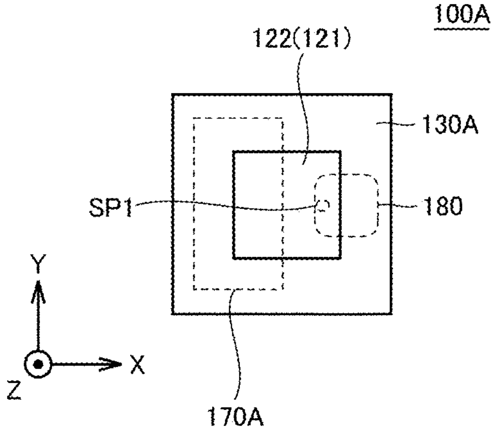
FIG. 7 is a plan view of the antenna module according to Modification 1.

FIG. 6 and FIG. 7 are a side perspective view and a plan view, respectively, of an antenna module 100A according to Modification 1. Referring to FIG. 6 and FIG. 7, in the antenna module 100A, dimensions of a dielectric substrate 130A in the X-axis direction and the Y-axis direction are shorter than those of the antenna module 100 of FIG. 2.

Accordingly, when the antenna module 100A is viewed in a plan view, a recess 170A is formed to have a rectangular shape having a long side extending in the Y-axis direction. In addition, a RFIC 110A is also shaped so that it can be placed in the recess 170A.

Further, when the antenna module 100A is viewed in a plan view, the filter device 105 is arranged such that a part of the filter region 180 overlaps with the radiating element 125. With such a configuration, even when the area of the main surface of the dielectric substrate is limited due to downsizing or the like of the antenna module, the height of the antenna module can be reduced without deteriorating the antenna characteristics and the filter characteristics. Further, since the distance of the feed wiring from the filter to the feed element can be shortened, the insertion loss of the antenna module can be improved.

(Modification 2)

Figure 8:
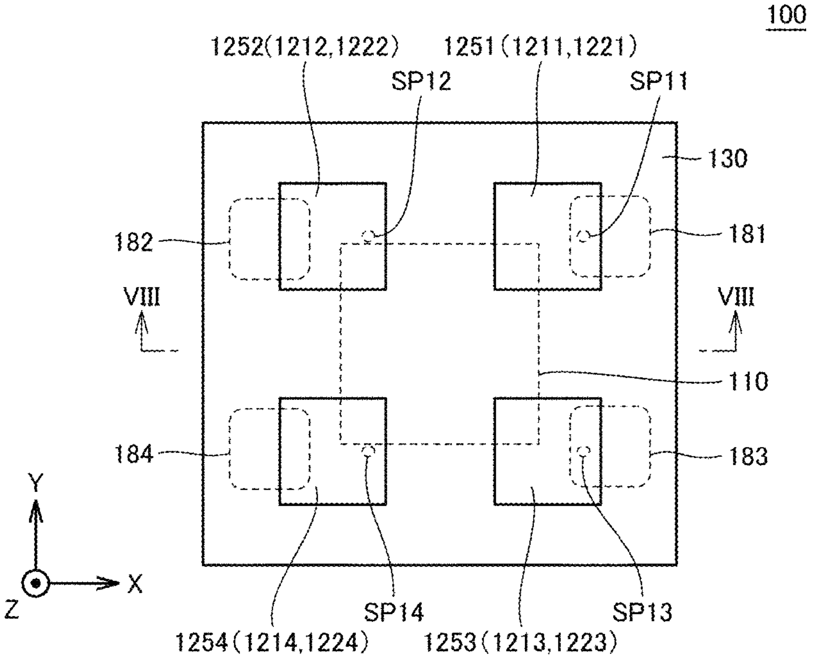
FIG. 8 is a plan view of an antenna module according to Modification 2.

In Modification 2, a case where the antenna device 120 is an array antenna will be described. FIG. 8 is a plan view of the antenna module 100 according to Modification 2. In addition, FIG. 9 is a side perspective view of the antenna module 100 viewed from a plane along a line VIII-VIII of FIG. 8.

Figure 9:
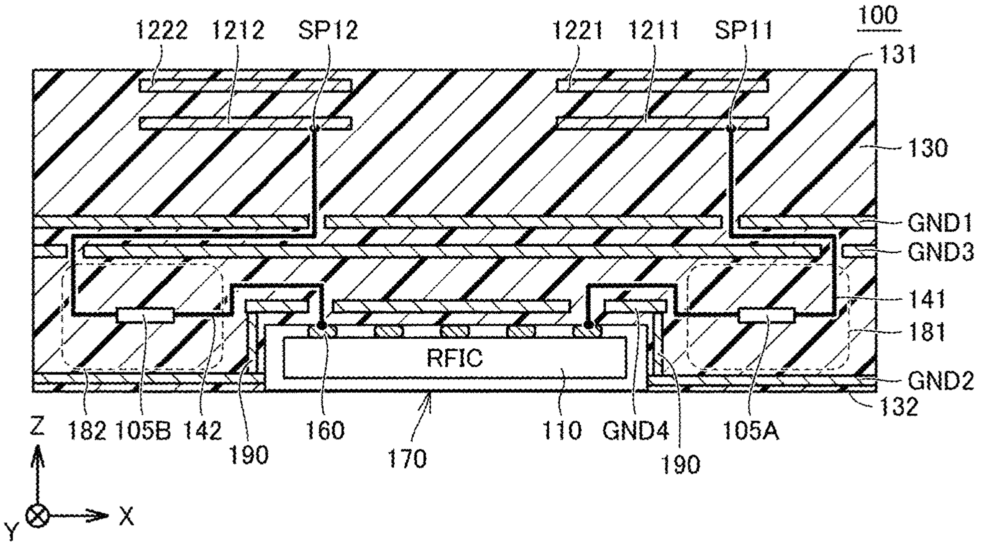
FIG. 9 is a side perspective view of the antenna module according to Modification 2.

Referring to FIG. 8 and FIG. 9, the antenna module 100 is an array antenna in which four radiating elements 125 (radiating elements 1251 to 1254) are arranged adjacent to each other in a 2×2 of two-dimensional array in the dielectric substrate 130. The radiating element 1251 includes a feed element 1211 and a parasitic element 1221, the radiating element 1252 includes a feed element 1212 and a parasitic element 1222, the radiating element 1253 includes a feed element 1213 and a parasitic element 1223, and the radiating element 1254 includes a feed element 1214 and a parasitic element 1224. As in Embodiment 1, the feed element 121 and the parasitic element 122 of each radiating element 125 have substantially the same size, and the feed element 121 is arranged between the parasitic element 122 and the ground electrode GND1.

Radio frequency signals from the RFIC 100 are transmitted to each feed element 121 via the filter device 105 by the feed wiring. To be specific, in FIG. 9, a feed wiring 141 is connected to a feed point SP11 of the feed element 1211 via the filter 105A. In addition, a feed wiring 142 is connected to a feed point SP12 of the feed element 1212 via the filter 105B. Note that although not illustrated in the figure, radio frequency signals are transmitted from the RFIC 100 to the feed elements 1213 and 1214 by a similar connection configuration.

The recess 170 is formed in the second main surface 132 of the dielectric substrate 130, and the RFIC 110 is arranged in the recess 170. As illustrated in FIG. 9, filter regions 181 and 182 formed by the filters 105A and 105B are arranged between the ground electrode GND3 and the ground electrode GND4, and the filters 105A and 105B are arranged such that the filter regions 181 and 182 do not overlap with the recess 170 when the dielectric substrate 130 is viewed in a plan view from the normal direction. Note that in Modification 2, due to the restriction on the size of the dielectric substrate 130, the radiating element and the corresponding filter at least partially overlap each other when the dielectric substrate 130 is viewed in a plan view as in Modification 1.

As described above, even in the case where the antenna module is an array antenna, by providing the recess in the dielectric substrate to accommodate a device such as the RFIC in the recess and arranging the filter region so as not to overlap with the recess when the dielectric substrate is viewed in a plan view, it is possible to reduce the height of the antenna module while maintaining antenna characteristics and filter characteristics.

Note that the "feed element 1211" and the "feed element 1212" in Modification 2 are examples of a "first feed element" and a "second feed element" in the present disclosure, respectively. In addition, the "feed wiring 141" and the "feed wiring 142" in Modification 2 are examples of the "first feed wiring" and a "second feed wiring" in the present disclosure, respectively.

(Modification 3)

In each of the antenna modules described above, the example has been described in which the recess of the dielectric substrate on which a device such as the RFIC is arranged is formed in a shape surrounded by four surfaces parallel to the X axis or the Y axis. However, a part of the surface surrounding the recess formed in the dielectric substrate may be open.

Figure 10:
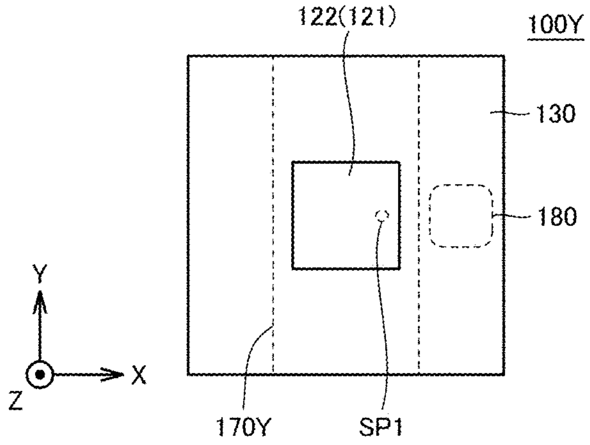
FIG. 10 is a plan view of an antenna module according to Modification 3.

For example, as in an antenna module 100Y according to Modification 3 illustrated in FIG. 10, a recess 170Y is surrounded by two surfaces along the Y-axis, and the recess 170Y is open to an end portion of the dielectric substrate 130 along the X-axis. In other words, the recess 170Y penetrates the dielectric substrate 130 in the X-axis direction.

In addition, although not illustrated in the figure, the recess may penetrate in the Y-axis direction, or one of four surfaces parallel to the X-axis or the Y-axis may be open to the end portion of the dielectric substrate 130.

(Modification 4)

In each of the above-described antenna modules, the configuration in which the radiating element and the ground electrode are formed on the same dielectric substrate has been described. However, the radiating element may be configured to be formed on a dielectric substrate different from the dielectric substrate on which the other elements are formed.

Figure 11:
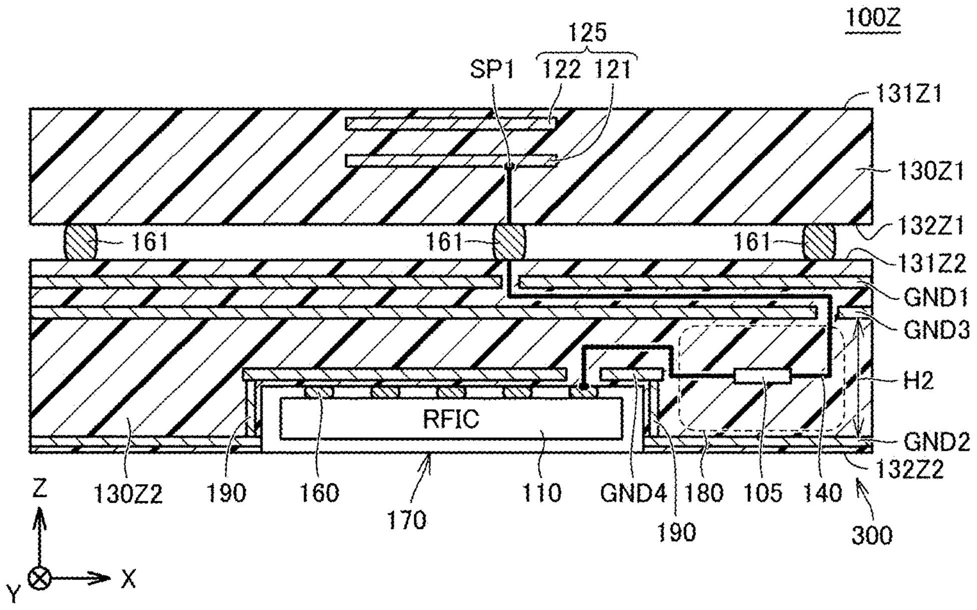
FIG. 11 is a side perspective view of an antenna module according to Modification 4.

FIG. 11 is a side perspective view of an antenna module 100Z according to Modification 4. In the antenna module 100Z, the radiating element 125 (the feed element 121 and the parasitic element 122) is formed on a dielectric substrate 130Z1, and elements other than the radiating element 125 are formed on a circuit board 300 independent of the dielectric substrate 130Z1. The dielectric substrate 130Z1 is arranged such that a second main surface 132Z1 of the dielectric substrate 130Z1 faces a first main surface 131Z2 of the circuit board 300. The dielectric substrate 130Z1 and the circuit board 300 are coupled by a solder bump 161. Note that instead of the solder bump 161, a connection connector or a connection cable may be used.

The circuit board 300 has a configuration in which elements other than the radiating element 125 in the antenna module 100 of FIG. 2 are arranged in a dielectric substrate 130Z2. The flat plate-shaped ground electrode GND1 is formed in an inner layer than the first main surface 131Z2 of the dielectric substrate 130Z2. The recess 170 is formed in a part of a second main surface 132Z2 of the dielectric substrate 130Z2. The RFIC 110 is mounted in the recess 170 via the solder bump 160.

In the dielectric substrate 130Z2, the ground electrode GND2 is formed on the second main surface 132Z2 other than the recess 170 or in an inner layer than the second main surface 132Z2 (that is, between the second main surface 132Z2 and the ground electrode GND1). Further, the ground electrode GND4 is arranged in the inner layer of the dielectric substrate 130Z2 in the recess 170 (i. e., between the recess 170 and the ground electrode GND1). The ground electrode GND4 is formed so as to close a cavity of the ground electrode GND1 formed in a portion of the recess 170. The ground electrode GND2 and the ground electrode GND4 are electrically connected by the plurality of vias 190.

In addition, the ground electrode GND3 is further arranged between the ground electrode GND1 and the ground electrodes GND2 and GND4. A layer between the ground electrode GND1 and the ground electrode GND3 functions as a wiring layer for arranging wiring for connecting elements in the dielectric substrate 130Z2.

The filter device 105 is arranged in a layer between the ground electrode GND2 and the ground electrode GND3. The filter device 105 is arranged at a position that does not overlap with the recess 170 when viewed in a plan view from the normal direction of the dielectric substrate 130Z2.

The feed wiring 140 transmits radio frequency signals from the RFIC 110 to the feed element 121 via the filter device 105. The feed wiring 140 penetrates the ground electrode GND3 after passing through the filter device 105, and extends in the wiring layer to a position directly below the feed element 121. The feed wiring 140 penetrates the ground electrode GND1 from there, reaches the dielectric substrate 130Z1 via the solder bump 161, and is connected to the feed point SP1 of the feed element 121.

In this manner, the circuit board on which the RFIC is arranged and the dielectric substrate on which the radiating element is formed are formed as separate substrates, whereby the degree of freedom of device arrangement in the communication device can be increased. For example, a configuration in which the circuit board may be arranged on a motherboard, and the radiating element may be arranged in a housing, can be adopted.

Embodiment 2

(Configuration of Communication Device)

In Embodiment 2, a case of a so-called dual-polarization antenna module capable of radiating two different polarizations from a radiating element will be described.

Figure 12:
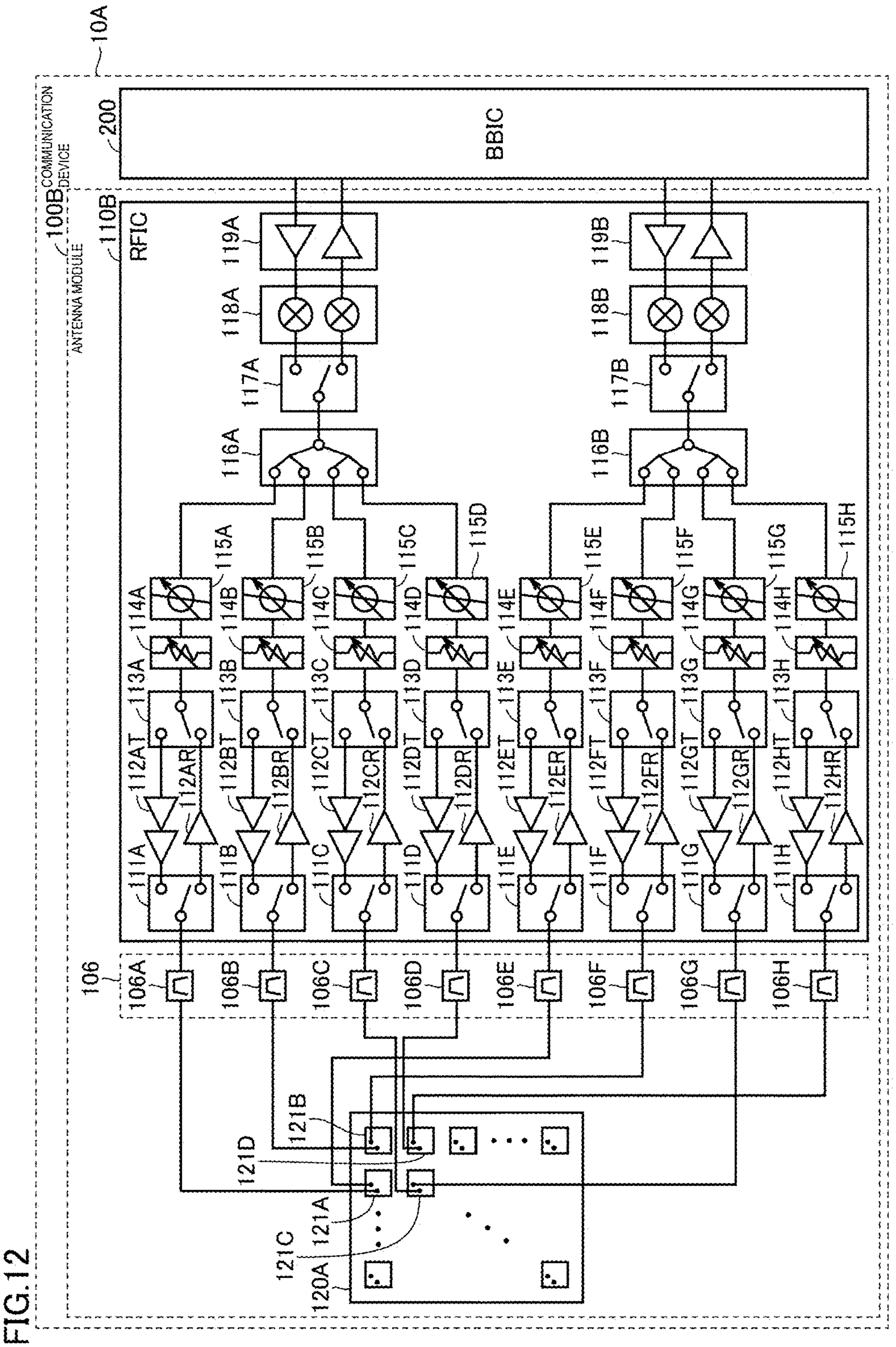
FIG. 12 is a block diagram of a communication device to which an antenna module according to Embodiment 2 is applied.

FIG. 12 is a block diagram of a communication device 10A to which an antenna module 100B according to Embodiment 2 is applied. Referring to FIG. 12, the communication device 10A includes the antenna module 100B and the BBIC 200. The antenna module 100B includes a RFIC 110B, an antenna device 120A, and a filter device 106.

The antenna device 120A is a dual-polarization antenna device as described above, and radio frequency signals for a first polarization and radio frequency signals for a second polarization are supplied from the RFIC 100B to the feed elements 121 (121A to 121D).

The RFIC 110B includes the switches 111A to 111D and 113A to 113D, switches 111E to 111H, 113E to 113H, 117A, and 117B, the power amplifiers 112AT to 112DT, power amplifiers 112ET to 112HT, the low-noise amplifiers 112AR to 112DR, low-noise amplifiers 112ER to 112HR, the attenuators 114A to 114D, attenuators 114E to 114H, the phase shifters 115A to 115D, phase shifters 115E to 115H, signal multiplexers/demultiplexers 116A and 116B, mixers 118A and 118B, and amplifier circuits 119A and 119B. Among these, the configurations of the switches 111A to 111D, 113A to 113D, and 117A, the power amplifiers 112AT to 112DT, the low-noise amplifiers 112AR to 112DR, the attenuators 114A to 114D, the phase shifters 115A to 115D, the signal multiplexer/demultiplexer 116A, the mixer 118A, and the amplifier circuit 119A are circuits for the radio frequency signals for the first polarization. In addition, the configurations of the switches 111E to 111H, 113E to 113H, and 117B, the power amplifiers 112ET to 112HT, the low-noise amplifiers 112ER to 112HR, the attenuators 114E to 114H, the phase shifters 115E to 115H, the signal multiplexer/demultiplexer 116B, the mixer 118B, and the amplifier circuit 119B are circuits for the radio frequency signals for the second polarization.

In the case of transmitting radio frequency signals, the switches 111A to 111H and 113A to 113H are switched to the power amplifiers 112AT to 112HT side, and the switches 117A and 117B are connected to the transmission-side amplifiers of the amplifier circuits 119A and 119B. In the case of receiving radio frequency signals, the switches 111A to 111H and 113A to 113H are switched to the low-noise amplifiers 112AR to 112HR side, and the switches 117A and 117B are connected to the reception-side amplifiers of the amplifier circuits 119A and 119B.

The filter device 106 includes filters 106A to 106H. The filters 106A to 106H are connected to the switches 111A to 111H in the RFIC 110B, respectively. Each of the filters 106A to 106H has a function of attenuating radio frequency signals in a specific frequency band.

Signals transmitted from the BBIC 200 are amplified by the amplifier circuits 119A and 119B and up-converted by the mixers 118A and 118B. The transmission signals, which are the up-converted radio frequency signals, are divided into four signals by the signal multiplexers/demultiplexers 116A and 116B, pass through corresponding signal paths, and are fed to the different feed elements 121.

Radio frequency signals from the switches 111A and 111E are supplied to the feed element 121A via the filters 106A and 106E, respectively. Similarly, radio frequency signals from the switches 111B and 111F are supplied to the feed element 121B via the filters 106B and 106F, respectively. Radio frequency signals from the switches 111C and 111G are supplied to the feed element 121C via the filters 106C and 106G, respectively. Radio frequency signals from the switches 111D and 111H are supplied to the feed element 121D via the filters 106D and 106H, respectively.

By individually adjusting the phase shift degrees of the phase shifters 115A to 115H arranged in the respective signal paths, the directivity of the antenna device 120A can be adjusted.

Reception signals, which are radio frequency signals received by the feed elements 121, are transmitted to the RFIC 110B via the filter device 106, and are multiplexed in the signal multiplexers/demultiplexers 116A and 116B via four different signal paths. The multiplexed reception signals are down-converted by the mixers 118A and 118B, amplified by the amplifier circuits 119A and 119B, and transmitted to the BBIC 200.

(Configuration of Antenna Module)

Figure 13:
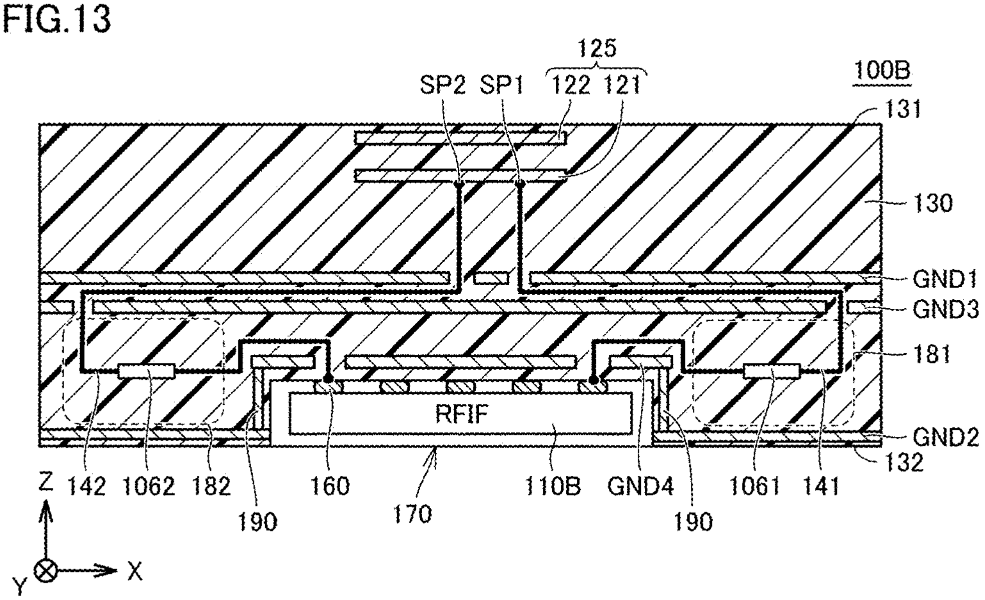
FIG. 13 is a side perspective view of the antenna module of FIG. 12.
Figure 14:
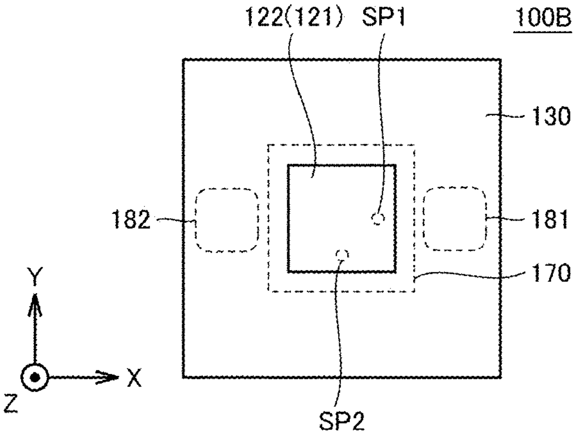
FIG. 14 is a plan view of the antenna module of FIG. 12.

Next, the configuration of the antenna module 100B according to Embodiment 2 will be described in detail with reference to FIG. 13 and FIG. 14. FIG. 13 illustrates a side perspective view of the antenna module 100B, and FIG. 14 illustrates a plan view of the antenna module 100B. Note that in FIG. 13 and FIG. 14, detailed description of elements that overlap with FIG. 2 and FIG. 3 of Embodiment 1 will not be repeated.

Referring to FIG. 13 and FIG. 14, also in the antenna module 100B, the recess 170 is formed in the second main surface 132 of the dielectric substrate 130, and the RFIC 110B is arranged in the recess 170.

In the antenna module 100B, radio frequency signals from the RFIC 110B are transmitted to the feed point SP1 of the feed element 121 by the feed wiring 141 via a filter 1061. In addition, the radio frequency signals from the RFIC 110B are also transmitted to a feed point SP2 of the feed element 121 by the feed wiring 142 via a filter 1062.

The feed point SP1 of the feed element 121 is arranged at a position offset from the center of the feed element 121 in the positive direction of the X-axis. Accordingly, when radio frequency signals are supplied to the feed point SP1, radio waves having a polarization direction corresponding to the X-axis direction (first direction) are emitted from the feed element 121. In addition, the feed point SP2 of the feed element 121 is arranged at a position offset from the center of the feed element 121 in the negative direction of the Y-axis. Thus, when radio frequency signals are supplied to the feed point SP2, radio waves having a polarization direction corresponding to the Y-axis direction (second direction) are emitted from the feed element 121.

Also in the antenna module 100B, the filter region 181 of the filter 1061 and the filter region 182 of the filter 1062 are both arranged between the ground electrode GND3 and the ground electrode GND4. Further, as illustrated in FIG. 14, each of the filters 1061 and 1062 is arranged such that the filter regions 181 and 182 do not overlap with the recess 170 when the dielectric substrate 130 is viewed in a plan view from the normal direction.

As described above, also in the dual-polarization antenna module with a built-in filter, the recess is provided in the dielectric substrate to accommodate a device such as the RFIC in the recess, and the filter region is arranged so as not to overlap with the recess when the dielectric substrate is viewed in a plan view, this makes it possible to reduce the height of the antenna module while maintaining antenna characteristics and filter characteristics.

Note that also in Embodiment 2, as described in Modification 1 of Embodiment 1, a part of the antenna region and the radiating element may overlap with each other when the dielectric substrate is viewed in a plan view.

Note that the "filter 1061" and the "filter 1062" in Embodiment 2 are examples of the "first filter" and a "second filter" in the present disclosure, respectively. In addition, the "feed wiring 141" and the "feed wiring 142" in Embodiment 2 are examples of the "first feed wiring" and the "second feed wiring" in the present disclosure, respectively.

Embodiment 3

(Configuration of Communication Device)

In Embodiment 3, a case of a so-called dual-band antenna module capable of radiating radio waves in two different frequency bands from a radiating element will be described.

Figure 15:
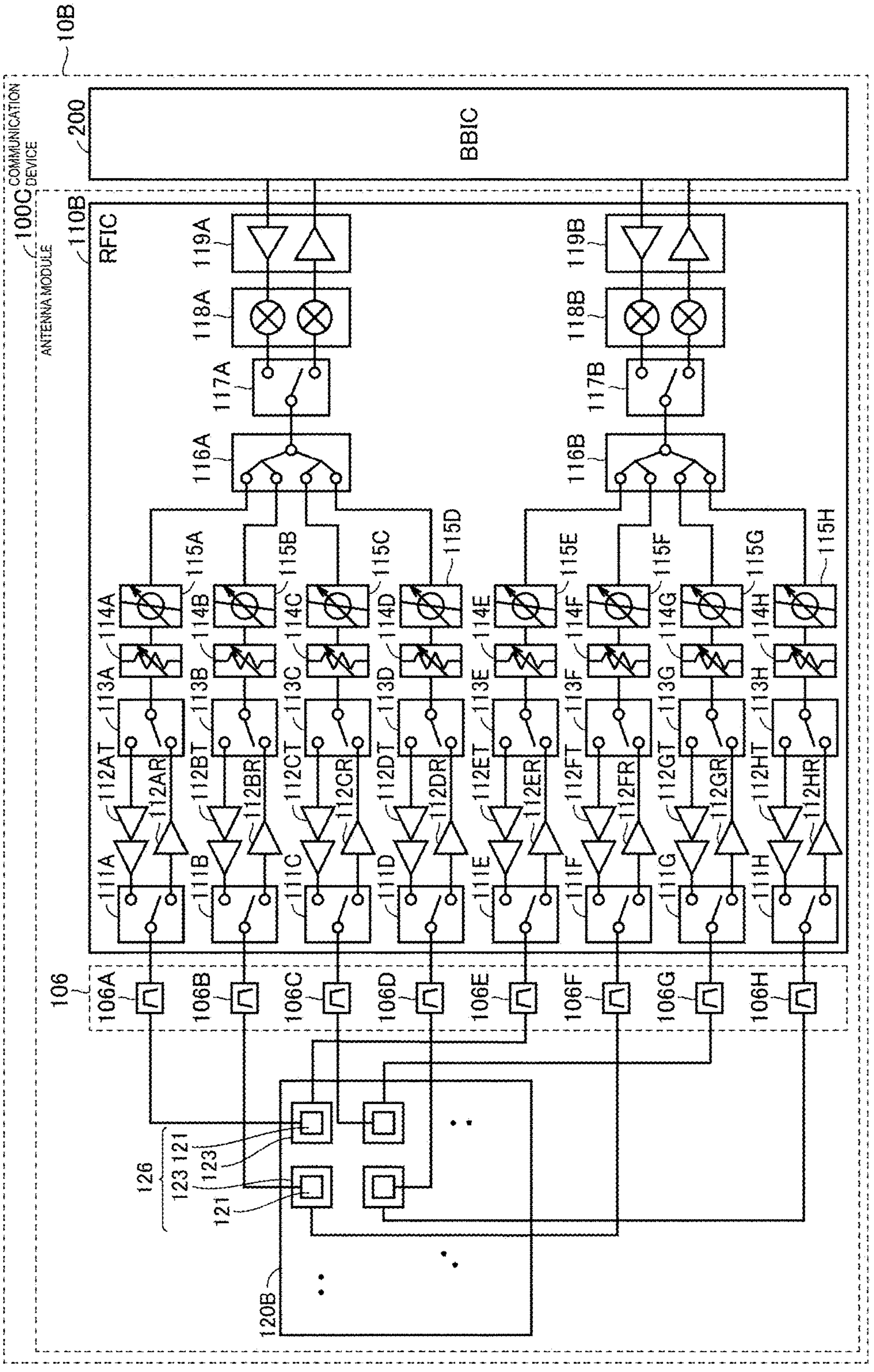
FIG. 15 is a block diagram of a communication device to which an antenna module according to Embodiment 3 is applied.

FIG. 15 is a block diagram of a communication device 10B to which an antenna module 100C according to Embodiment 3 is applied. Referring to FIG. 15, the communication device 10B includes the antenna module 100C and the BBIC 200. The antenna module 100C includes the RFIC 110B, an antenna device 120B, and the filter device 106.

The antenna device 120B is a dual-band antenna device as described above, and each radiating element 126 arranged in the antenna device 120B includes two feed elements 121 and 123. Radio frequency signals are individually supplied from the RFIC 110B to the feed elements 121 and 123.

The RFIC 110B basically has a device configuration similar to that of the RFIC described in Embodiment 2. However, in antenna module 100C of Embodiment 3, the configurations of the switches 111A to 111D, 113A to 113D, and 117A, the power amplifiers 112AT to 112DT, the low-noise amplifiers 112AR to 112DR, the attenuators 114A to 114D, the phase shifters 115A to 115D, the signal multiplexer/demultiplexer 116A, the mixer 118A, and the amplifier circuit 119A are circuits for radio frequency signals for the feed element 121, and the configurations of the switches 111E to 111H, 113E to 113H, and 117B, the power amplifiers 112ET to 112HT, the low-noise amplifiers 112ER to 112HR, the attenuators 114E to 114H, the phase shifters 115E to 115H, the signal multiplexer/demultiplexer 116B, the mixer 118B, and the amplifier circuit 119B are circuits for radio frequency signals for the feed element 123.

In addition, in the filter device 106, the filters 106A to 106D are formed as filters having a pass band corresponding to the frequency band of radio waves emitted from the feed element 121. On the other hand, the filters 106E to 106H are formed as filters having a pass band corresponding to the frequency band of radio waves emitted from the feed element 123.

(Configuration of Antenna Module)

Figure 16:
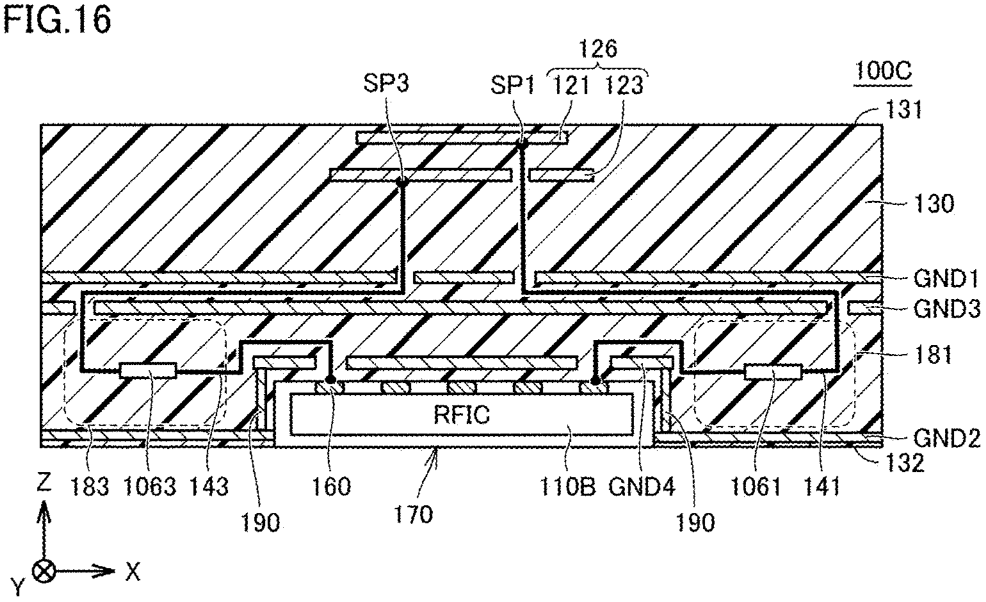
FIG. 16 is a side perspective view of the antenna module of FIG. 15.
Figure 17:
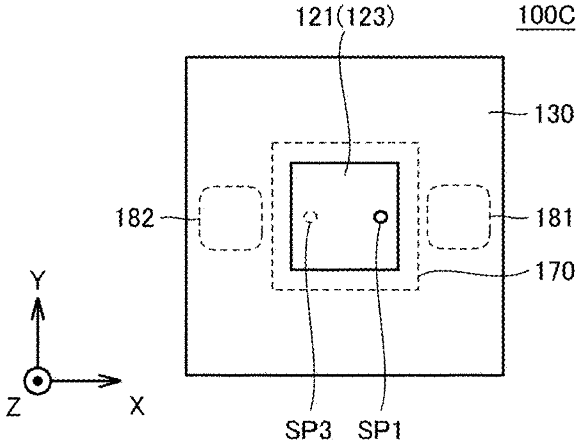
FIG. 17 is a plan view of the antenna module of FIG. 15.

Next, the configuration of the antenna module 100C according to Embodiment 3 will be described in detail with reference to FIG. 16 and FIG. 17. FIG. 16 illustrates a side perspective view of the antenna module 100C, and FIG. 17 illustrates a plan view of the antenna module 100C. Note that in FIG. 16 and FIG. 17, detailed description of elements that overlap with FIG. 2 and FIG. 3 of Embodiment 1 or FIG. 13 and FIG. 14 of Embodiment 2 will not be repeated.

Referring to FIG. 16 and FIG. 17, also in the antenna module 100C, the recess 170 is formed in the second main surface 132 of the dielectric substrate 130, and the RFIC 110B is arranged in the recess 170.

The feed element 121 is arranged on the first main surface 131 of the dielectric substrate 130 or in an inner layer than the first main surface 131. Further, the feed element 123 is arranged in a layer on the lower side than the feed element 121 so as to face the feed element 121. That is, the feed element 123 is arranged in a layer between the feed element 121 and the ground electrode GND1 so as to face the feed element 121.

The feed element 121 and the feed element 123 are a patch antenna having a substantially square planar shape. The size of the feed element 121 is smaller than the size of the feed element 123. Therefore, the resonant frequency of the feed element 121 is higher than the resonant frequency of the feed element 123. Therefore, the feed element 121 emits radio waves in a frequency band higher than that of the feed element 123.

In the antenna module 100C, radio frequency signals from the RFIC 110B are transmitted to the feed point SP1 of the feed element 121 by the feed wiring 141 via the filter 1061. In addition, the radio frequency signals from the RFIC 110B are also transmitted to a feed point SP3 of the feed element 123 by a feed wiring 143 via a filter 1063.

Also in the antenna module 100C, the filter region 181 formed by the filter 1061 and a filter region 183 formed by the filter 1063 are both arranged between the ground electrode GND3 and the ground electrode GND4. In addition, as illustrated in FIG. 17, each of the filters 1061 and 1063 is arranged such that the filter regions 181 and 183 do not overlap with the recess 170 when the dielectric substrate 130 is viewed in a plan view from the normal direction.

As described above, also in the dual-band antenna module with a built-in filter, by providing the recess in the dielectric substrate to accommodate a device such as the RFIC in the recess and arranging the filter region so as not to overlap with the recess when the dielectric substrate is viewed in a plan view, it is possible to reduce the height of the antenna module while maintaining antenna characteristics and filter characteristics.

Note that the "feed element 121" and the "feed element 123" in Embodiment 3 correspond to the "first feed element" and the "second feed element" in the present disclosure, respectively. The "filter 1061" and the "filter 1063" in Embodiment 3 correspond to the "first filter" and the "second filter" in the present disclosure, respectively. Further, the "feed wiring 141" and the "feed wiring 143" in Embodiment 3 correspond to the "first feed wiring" and the "second feed wiring" in the present disclosure, respectively.

Embodiment 4

In Embodiment 3, the dual-band antenna module configured to individually supply a radio frequency signal to each of the two feed elements arranged to face each other in the lamination direction of the dielectric substrate has been described.

In Embodiment 4, a dual-band antenna module configured to emit radio waves in different frequency bands from a feed element and a parasitic element by causing a feed wiring for supplying a radio frequency signal to the feed element to penetrate the parasitic element will be described with reference to FIG. 18 and FIG. 19.

Figure 18:
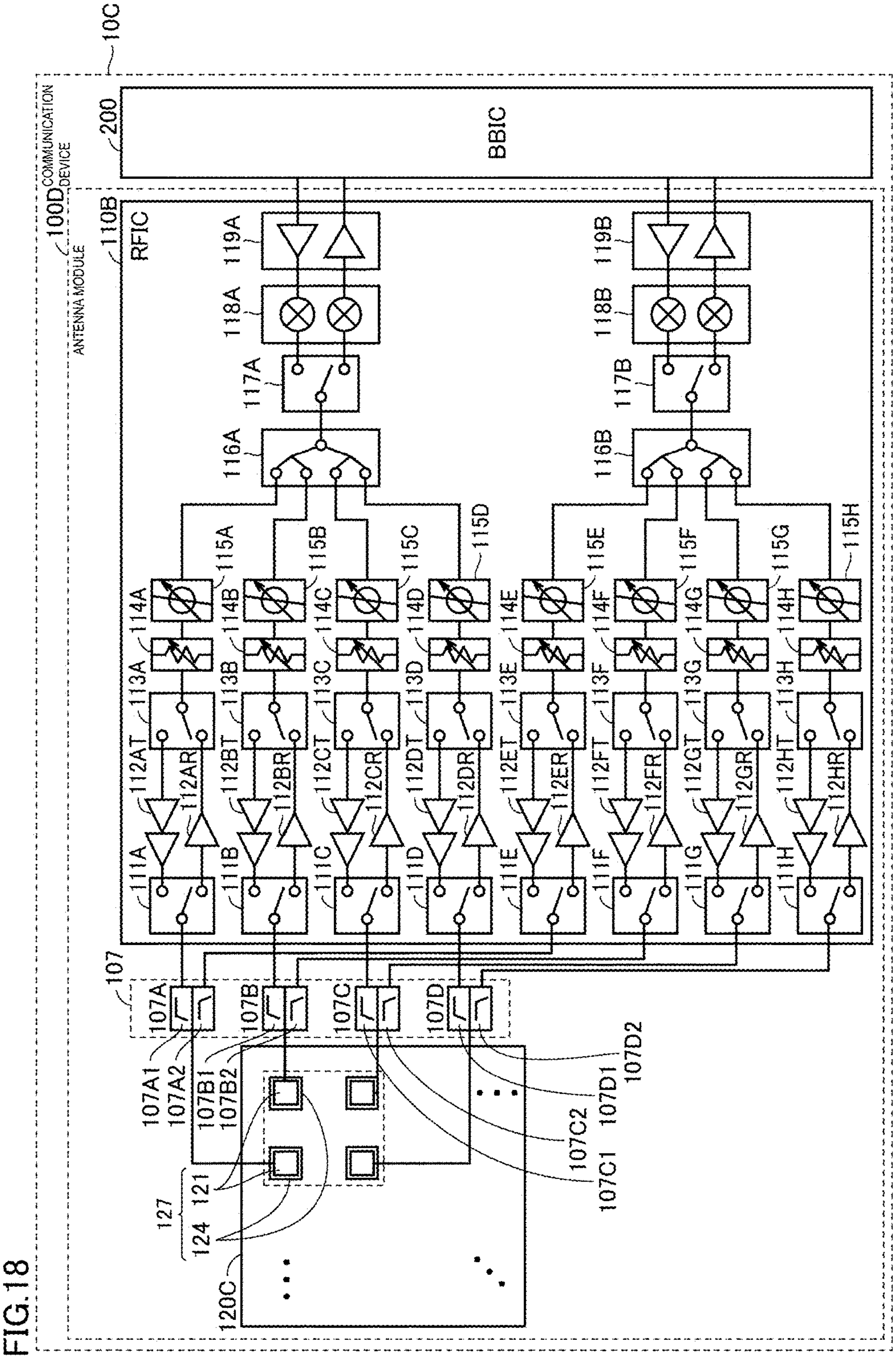
FIG. 18 is a block diagram of a communication device to which an antenna module according to Embodiment 4 is applied.

FIG. 18 is a block diagram of a communication device 10C to which an antenna module 100D according to Embodiment 4 is applied. In addition, FIG. 19 is a side perspective view of the antenna module 100D of FIG. 18. Note that in FIG. 18 and FIG. 19, detailed description of the same elements as those in FIG. 2 and the like will not be repeated.

Referring to FIG. 18, the communication device 10C includes the antenna module 100D and the BBIC 200. The antenna module 100D includes the RFIC 110B, an antenna device 120C, and a filter device 107. The antenna device 120C is a dual-band antenna device, and each radiating element 127 arrayed in the antenna device 120C includes the feed element 121 and a parasitic element 124.

Figure 19:
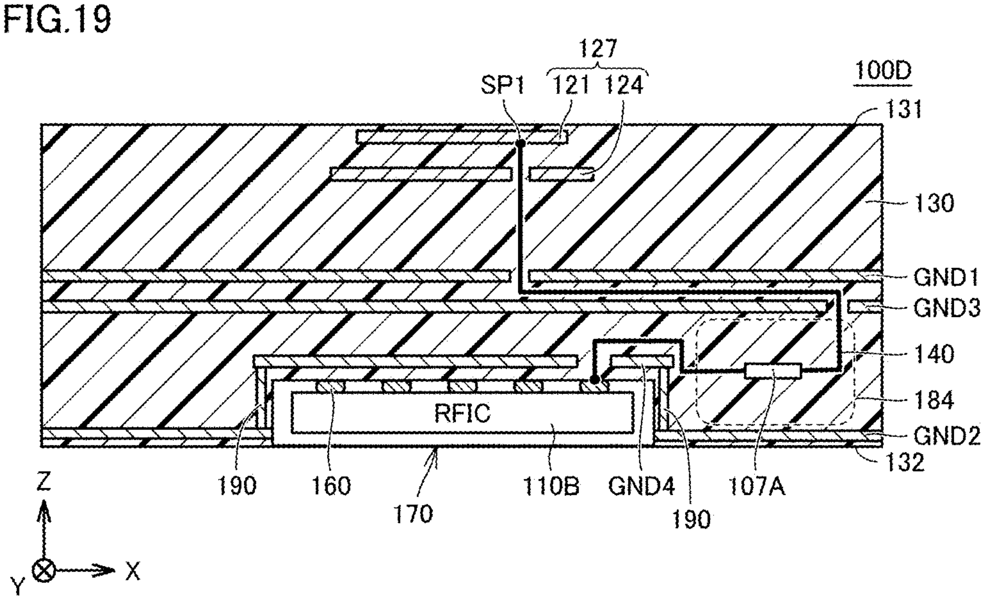
FIG. 19 is a side perspective view of the antenna module of FIG. 18.

As illustrated in FIG. 19, the feed element 121 and the parasitic element 124 are patch antennas each having a substantially square planar shape. The parasitic element 124 is arranged in a layer between the feed element 121 and the ground electrode GND1 in the dielectric substrate 130. The feed wiring 140 passes through a diplexer 107A and penetrates the parasitic element 124 to be connected to the feed point SP1 of the feed element 121. The size of the parasitic element 124 is larger than the size of the feed element 121, and the resonant frequency of the parasitic element 124 is lower than the resonant frequency of the feed element 121. By supplying a radio frequency signal corresponding to the resonant frequency of the parasitic element 124 to the feed wiring 140, radio waves in a frequency band lower than that of the feed element 121 can be emitted from the parasitic element 124.

The RFIC 110B basically has the configuration similar to that of the RFIC described in Embodiment 3. That is, the configurations of the switches 111A to 111D, 113A to 113D, and 117A, the power amplifiers 112AT to 112DT, the low-noise amplifiers 112AR to 112DR, the attenuators 114A to 114D, the phase shifters 115A to 115D, the signal multiplexer/demultiplexer 116A, the mixer 118A, and the amplifier circuit 119A are circuits for radio frequency signals for the feed element 121, and the configurations of the switches 111E to 111H, 113E to 113H, and 117B, the power amplifiers 112ET to 112HT, the low-noise amplifiers 112ER to 112HR, the attenuators 114E to 114H, the phase shifters 115E to 115H, the signal multiplexer/demultiplexer 116B, the mixer 118B, and the amplifier circuit 119B are circuits for radio frequency signals for the parasitic elements 124.

The filter device 107 includes a diplexer 107A and diplexers 107B to 107D. Each diplexer includes a high pass filter (filters 107A1, 107B1, 107C1, and 107D1) that causes radio frequency signals in a high-frequency band to pass therethrough and a low pass filter (filters 107A2, 107B2, 107C2, and 107D2) that causes radio frequency signals in a low-frequency band to pass therethrough. The filters 107A1, 107B1, 107C1, and 107D1 are respectively connected to the switches 111A to 111D in the RFIC 110B. In addition, the filters 107A2, 107B2, 107C2, and 107D2 are respectively connected to the switches 111E to 111H in the RFIC 110B. Each of the diplexers 107A to 107D is connected to the corresponding feed element 121.

The transmission signals from the switches 111A to 111D of the RFIC 110B respectively pass through the filters 107A1 to 107D1, which are high pass filters, and are emitted from the corresponding feed elements 121. The transmission signals from the switches 111E to 111H of the RFIC 100B respectively pass through the filters 107A2 to 107D2, which are low pass filters, and are emitted from the corresponding parasitic elements 124.

Also in the antenna module 100D, the recess 170 is formed in the second main surface 132 of the dielectric substrate 130, and the RFIC 110B is arranged in the recess 170. A filter region 184 formed by the diplexer 107A is arranged between the ground electrode GND3 and the ground electrode GND4, and the diplexer 107A is arranged such that the filter region 184 does not overlap with the recess 170 when the dielectric substrate 130 is viewed in a plan view from the normal direction.

As described above, also in the dual-band antenna module with a built-in filter using the radiating element formed of the feed element and the parasitic element, by providing the recess in the dielectric substrate to accommodate an device such as the RFIC in the recess and arranging the filter region so as not to overlap with the recess when the dielectric substrate is viewed in a plan view, the height of the antenna module can be reduced while maintaining the antenna characteristics and the filter characteristics.

Note that the "feed element 121" in Embodiment 4 corresponds to the "first feed element" in the present disclosure. The "diplexer 107A" in Embodiment 4 is an example of the "first filter" in the present disclosure. The "feed wiring 140" in Embodiment 4 corresponds to the "first feed wiring" in the present disclosure.

Note that although the case where the dielectric substrate 130 is formed of a single type of dielectric has been described in the above embodiments and modifications, a dielectric having a dielectric constant suitable for an antenna may be used in a region where an antenna is formed (between the first main surface 131 and the ground electrode GND1), and a dielectric having a dielectric constant suitable for a filter may be used in a region where a filter is formed (between the ground electrode GND2 and the ground electrode GND3).

The embodiments disclosed herein are to be considered in all respects as illustrative and not restrictive. The scope of the present disclosure is defined not by the description of the above-described embodiments but by the claims, and is intended to include all modifications within the meaning and scope equivalent to the claims.

REFERENCE SIGNS LIST

10, 10A to 10C COMMUNICATION DEVICE
100, 100A to 100D, 100X to 100Z ANTENNA MODULE
105 to 107 FILTER DEVICE
105A to 105D, 106A to 106H, 107A1 to 107D1, 107A2 to 107D2, 1061 to 1063 FILTER
107A to 107D DIPLEXER
110, 110A, 110B RFIC
111A to 111H, 113A to 113H, 117, 117A, 117B SWITCH
112AR to 112HR LOW-NOISE AMPLIFIER
112AT to 112HT POWER AMPLIFIER
114A to 114H ATTENUATOR
115A to 115H PHASE SHIFTER
116, 116A, 116B SIGNAL MULTIPLEXER/DEMULTIPLEXER
118, 118A, 118B MIXER
119, 119A, 119B AMPLIFIER CIRCUIT
120, 120A to 120C ANTENNA DEVICE
121, 121A to 121D, 123, 1211 to 1214 FEED ELEMENT
122, 124, 1221 to 1224 PARASITIC ELEMENT
125 to 127, 1251 and 1254 RADIATING ELEMENT
130 130A, 130Z1, 130Z2 DIELECTRIC SUBSTRATE

131, 131Z1, 131Z2, 132, 132Z1, 132Z2 MAIN SURFACE
140 to 143 FEED WIRING
160, 161 SOLDER BUMP
170, 170A, 170Y RECESS
180 to 184 FILTER REGION
190 VIA
200 BBIC
300 CIRCUIT BOARD
GND1 to GND4 GROUND ELECTRODE
SP1 to SP3, SP11 to SP14 FEED POINT

The invention claimed is:

1. An antenna module comprising:
a dielectric substrate of a multilayer structure having a first main surface and a second main surface;
a radiating element formed on the first main surface or in an inner layer of the dielectric substrate;
a first feed wiring that conveys a radio frequency signal to the radiating element;
a first filter arranged on a signal path of the first feed wiring; and
a first ground electrode that faces the radiating element and is arranged in a layer between the radiating element and the first filter, wherein
the second main surface of the dielectric substrate includes a recess, and
in a plan view from a normal direction of the dielectric substrate, the first filter does not overlap the recess.

2. The antenna module according to claim 1, further comprising:
a terminal that is disposed in the recess and is configured to electrically connect to an external device.

3. The antenna module according to claim 1, further comprising:
an electronic component disposed in the recess.

4. The antenna module according to claim 3, wherein the electronic component includes a feed circuit.

5. The antenna module according to claim 3, wherein portions of the recess not occupied by other structures are filled with a dielectric.

6. The antenna module according to claim 1, wherein in a plan view from a normal direction of the dielectric substrate, the first filter is arranged at a position that overlaps the radiating element.

7. The antenna module according to claim 1, further comprising:
a second ground electrode arranged on the second main surface of the dielectric substrate or between the second main surface and the first ground electrode,
wherein the first filter is arranged between the first ground electrode and the second ground electrode.

8. The antenna module according to claim 1,
wherein the radiating element includes:
a first feed element; and
a parasitic element arranged in a layer between the first feed element and the first ground electrode so as to face the first feed element,
the first feed wiring penetrates the parasitic element and is connected to the first feed element, and
a frequency band of a radio wave emitted from the parasitic element is different from a frequency band of a radio wave emitted from the first feed element.

9. The antenna module according to claim 1, further comprising:
a second feed wiring that transmits a radio frequency signal to the radiating element; and
a second filter arranged on the second feed wiring, wherein
in a plan view from a normal direction of the dielectric substrate, the second filter does not overlap with the recess.

10. The antenna module according to claim 9,
wherein a radio wave having a polarization direction in a first direction is emitted from the radiating element by a radio frequency signal conveyed by the first feed wiring, and
a radio wave having a polarization direction in a second direction orthogonal to the first direction is emitted from the radiating element by a radio frequency signal conveyed by the second feed wiring.

11. The antenna module according to claim 9, wherein the radiating element includes:
a first feed element to which a radio frequency signal is provided by the first feed wiring; and
a second feed element which is arranged in a layer between the first feed element and the first ground electrode so as to face the first feed element and to which a radio frequency signal is provided by the second feed wiring, and
a transmission frequency band of the second feed element is different from a transmission frequency band of the first feed element.

12. The antenna module according to claim 9,
wherein the radiating element includes:
a first feed element to which a radio frequency signal is provided by the first feed wiring; and
a second feed element which is arranged adjacent to the first feed element and to which a radio frequency signal is provided by the second feed wiring.

13. A communication device comprising:
the antenna module according to claim 1.

14. The communication device according to claim 13, wherein the antenna module further comprising an electronic component disposed in the recess.

15. The communication device according to claim 14, wherein portions of the recess not occupied by other structures are filled with a dielectric.

16. An antenna module comprising:
a dielectric substrate of a multilayer structure having a first main surface and a second main surface;
a radiating element formed on the first main surface or in an inner layer of the dielectric substrate;
a feed wiring that conveys a radio frequency signal to the radiating element;
a filter arranged on a signal path of the feed wiring;
a first ground electrode that faces the radiating element and is arranged in a layer between the radiating element and the filter;
a second ground electrode formed on the second main surface of the dielectric substrate or in another inner of the dielectric substrate; and
an electronic component, wherein
a recess that is offset from the second main surface toward the first main surface is formed in the second ground electrode,
the electronic component is arranged in the recess, and
the filter is arranged at a position that does not overlap with the recess when viewed in a plan view from a normal direction of the dielectric substrate.

17. A communication device comprising:
the antenna module according to claim 16.

18. The communication device according to claim 17, wherein the antenna module further comprising an electronic component disposed in the recess.

19. The communication device according to claim 18, wherein portions of the recess not occupied by other structures are filled with a dielectric.

20. A circuit board configured to supply a radio frequency signal to a radiating element, comprising:

a dielectric substrate of a multilayer structure having a first main surface and a second main surface;

a feed wiring that conveys a radio frequency signal to the radiating element;

a filter arranged on a signal path of the feed wiring; and a ground electrode arranged in a layer between the first main surface and the filter, wherein the second main surface of the dielectric substrate includes a recess, and in a plan view from a normal direction of the dielectric substrate, the filter does not overlap with the recess.

* * * * *